C. M. TESSIÉ du MOTAY.
Process and Apparatus for Producing Hydrogen Gas.
No. 229,338. Patented June 29, 1880.

C. M. TESSIÉ du MOTAY.
Process and Apparatus for Producing Hydrogen Gas.
No. 229,338. Patented June 29, 1880.

C. M. TESSIÉ du MOTAY.
Process and Apparatus for Producing Hydrogen Gas.

No. 229,338. Patented June 29, 1880.

UNITED STATES PATENT OFFICE.

CYPRIEN MARIE TESSIÉ DU MOTAY, OF PARIS, FRANCE.

PROCESS AND APPARATUS FOR PRODUCING HYDROGEN GAS.

SPECIFICATION forming part of Letters Patent No. 229,338, dated June 29, 1880.

Application filed May 17, 1879.

*To all whom it may concern:*

Be it known that I, CYPRIEN MARIE TESSIÉ DU MOTAY, of Paris, France, resident in New York, N. Y., have invented a new and useful Process for Producing Hydrogen Gas and new and useful Apparatus for Carrying the Same into Effect, (Case F,) of which the following is a specification.

My process has relation to the production of hydrogen by the conversion of superheated steam carrying with it a certain amount of vapor of naphtha, or its equivalent, in the presence of highly-heated lime, which causes the conversion of said lime into carbonate of lime; and also of the subsequent reconversion of said carbonate of lime into lime, enabling the process, by means of two furnaces, to be continually carried on.

The conversion of the carbonate of lime into lime is accomplished by highly heating such carbonate of lime in the presence of a certain amount of water or steam, the gases resulting from this reaction being allowed to escape.

By means of the apparatus shown hydrogen gas can be continuously produced by the employment of two sets of superheaters and two converting-furnaces, which can be alternately used.

The principal features of the apparatus by which my process is carried out are, in the first place, a generator capable of producing carbonic oxide. This carbonic oxide, passing from this apparatus, is partly used for heating the steam-boiler which supplies the steam necessary in the subsequent steps of my process, and is partly carried into a superheating apparatus, which is filled with highly-heated masses of refractory material. This superheater is made double, having two chambers, so that one may be heated by the combustion in it of carbonic oxide and air, while the other is being used to heat the steam and naphtha which are passing through it.

This hydrocarbon in the apparatus shown is fed into the top of the superheater from a vessel containing it by the flow of steam, which comes in contact with a spray of such naphtha and carries it in suspension to the top of the superheating-chamber.

Any form of hydrocarbon could be used for this purpose, and various means of mingling it with the steam could be employed. The one shown, however, is a convenient and ready means of carrying out this part of the process.

The combined vapors of water and naphtha, passing down through a superheating-chamber which is not sufficiently hot to convert the naphtha into a fixed gas, are subsequently taken to the converting-furnaces, which are two in number in my apparatus. These converting-furnaces are preferably of the construction shown, which is somewhat peculiar. They do not consist either of a vertical or of a horizontal chamber or chambers, but each furnace consists of two halves or separate chambers connected at one end and disconnected at the other. As shown in the drawings, these chambers are in the form of a bent cylinder, being highest in the middle and lowest at the two ends, their bottoms, forming two inclined planes, allowing the feeding of the lime into them through a central feeding-aperture in either direction.

The furnace is made in two parts, with the object of having one portion cooler than the other. The mixed steam and naphtha vapor passes first into the hottest portion of this furnace, which is filled with lime. The result of the chemical reaction of this highly-heated mixture of steam and naphtha with the heated lime is the production of hydrogen in a free— that is, uncombined—state by the transformation of the gas into hydrogen and carbonic acid, the latter being simply mixed, not combined, with the hydrogen. This carbonic acid is subsequently taken up by the lime in the cooler portion of the double furnace, the lime in the first portion being too hot to enter into combination with the carbonic acid and form carbonate of lime. After this process has been carried on until the temperature of the lime has been reduced so far as to render a cessation advisable, the flow of naphtha and steam is diverted into another similar furnace, which has been in the meantime heated in a manner to be described. This is done by introducing into that end of the double furnace where the lime has been converted into carbonate of lime a stream of gas containing a certain amount of water, or capable of producing by its combustion a certain amount of water and a stream of air.

The gas used in this reconversion of the carbonate of lime into lime can be obtained from the gas-generator previously spoken of as producing carbonic oxide by using such gas-generator for the production of carbureted hydrogen or other gas containing a certain amount of hydrogen; or a separate gas-generator might be employed for this purpose, the essential qualities of the gas so used being that it must be capable of combustion at a high temperature, and at the same time of bringing in contact with or in the presence of the carbonate of lime a certain amount of water, or water in the shape of steam. It is the reconversion of the carbonate of lime into lime which I consider the most important improvement in this process. The use of a current of steam, carrying with it a certain amount of naphtha or equivalent hydrocarbon, and its conversion into hydrogen in the presence of lime, is also, I believe, new in this process.

There is an essential difference between the resulting products of steam and naphtha which have come in contact with heated brick or other similar substance and the resulting products of the same substances passed over heated lime, the products, in the first instance, being, essentially, carbonic oxide and hydrogen, and in the second instance carbonic acid and hydrogen. In both cases other impurities are present. The reaction and decomposition likewise take place at a lower temperature in the presence of heated lime than of heated brick, and there is, therefore, much less danger of burning the naphtha and making lamp-black, which is one of the most series difficulties encountered in the production of combustible illuminating-gas.

It is obvious that many forms of apparatus can be used in carrying out this invention, and the apparatus which I shall describe is only one of many forms which might be devised for this purpose.

A represents any one of the well-known forms of gas-generators capable of producing carbonic oxide, or, preferably in this apparatus, either carbureted hydrogen or carbonic oxide carrying with it a certain amount of hydrogen. The gas produced in this generator is carried off by pipes $c$ to a boiler, (not shown,) or, when desired, by pipes $p$ to the superheating apparatus, to be described. These pipes are, of course, provided with suitable valves for the control of the gas, as is indeed true of the other pipes of the apparatus. Two valves are shown in the pipe $p$, Fig. 4, one being a screw-valve, by means of which the amount of gas passing through can be controlled, and the other is shown in the water-seal W. From this water-seal two pipes, $m\,m$, lead to the superheaters, and each of them is provided with a water-seal cup, $q$, by means of which the flow of gas from the generator A can be diverted from either one of the superheaters; but these valves and other arrangements are matters of detail, which I do not claim in this application, since they may be supplied by any intelligent gas-engineer.

C C are two superheaters, which may be alternately used when it is desired to keep up a constant supply of the gas; but it is plain that all the parts in this apparatus which are duplicated might be used singly in case a continuous supply is not requisite. This superheater consists in a vertical chamber provided with appropriate supply-openings B. The pipe $m$ from the gas-generator A delivers into the top of this chamber, which is filled with some refractory material, such as fire-brick. The bottom of this chamber is provided with a purge-pipe, K, Fig. 4, opening into the chamber by means of the aperture L. This purge-pipe is, of course, provided with a suitable purge-valve, $t$, as shown. The bottom of the chambers communicate likewise with the pipe $b$, leading to the converting-furnaces. The pipe $n$, which enters the superheater C at its top, passing in through the center of the gas-supply pipe $m$, supplies a sufficient quantity of air for the proper combustion of the gas produced in the generator A. Superheater C is also provided with a steam-supply pipe, $a$, which communicates with the carbureting apparatus D. (Shown more fully in section in Fig. 3.) This apparatus consists of a chamber, D, provided with a rose-spray, M, supplied by pipe $b'$ from pump P, which takes the naphtha from the supply-tank N.

The generator A may be provided with superheaters S, and steam from a boiler (not shown) passes, by pipe $i'$, through a regulating-valve, R, which automatically controls the pressure. Passing through this valve, it divides, part going by pipe $d'$ to superheaters S, and part by pipe $e'$ to pump P, so that the steam which operates the supply-pump and which passes through the superheaters is regulated by the same valve, and an increased flow of steam would be accompanied by an increased flow of naphtha. The steam passing through the superheaters arrives at the carbureter by the pipe $f'$. When moving upward it is met by the supply of naphtha from the rose-spray M, which it carries off in suspension by the pipe $a$.

Figure 4:
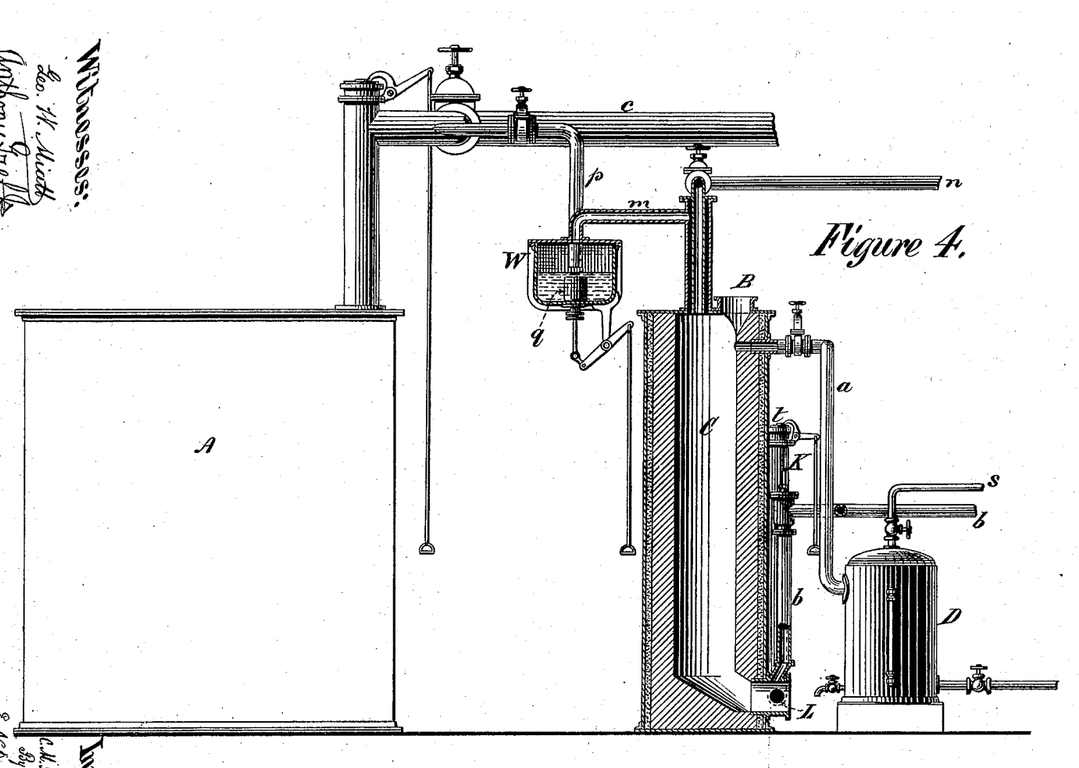
Fig. 4 represents a view, partially in section, of the naphtha-supply apparatus, the gas-generator, one of the superheaters, and the necessary connections.
Figure 5:
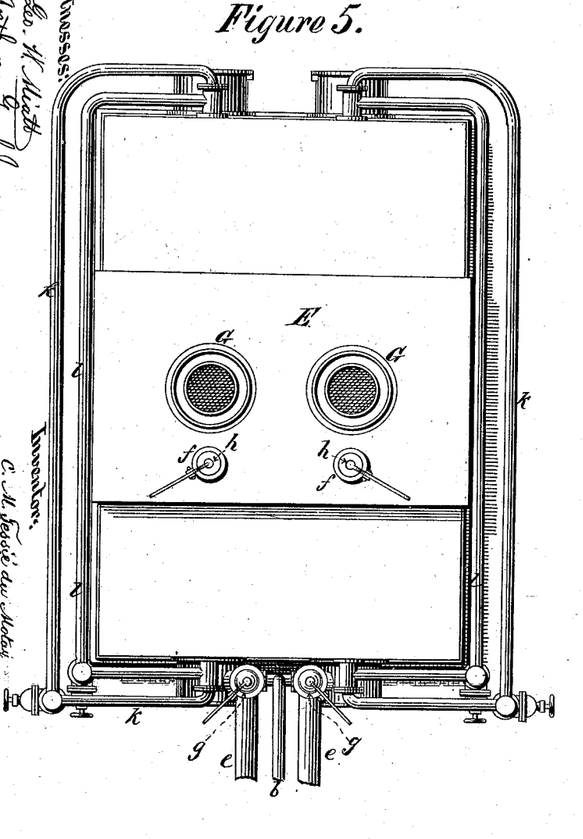
Fig. 5 represents a top view of the converting-furnaces.

$g'$ represents a by-pass pipe, by which the supply of naphtha can be entirely cut off by allowing it to return to the tank. Two valves, $h'$, are also shown, by means of one of which the supply can be regulated, and by the other of which the supply could be shut off entirely without altering the regulating-valve previously set. The superheated steam and naphtha, passing out by the pipe $a$, are delivered into the top of the superheater C, as shown in Fig. 4.

The connections are somewhat differently arranged in the different figures; but this is a matter of small importance, and may be arranged to suit the circumstances of the works.

Figure 6:
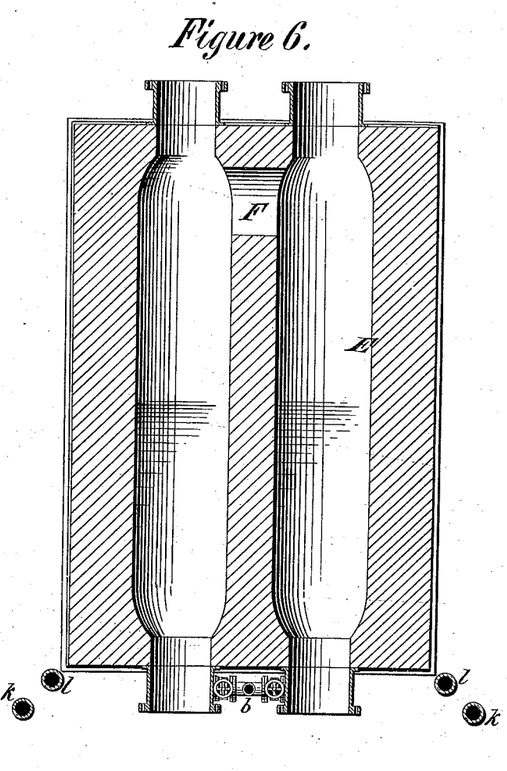
Fig. 6, a horizontal section of the same.
Figures 7, 8, 9:
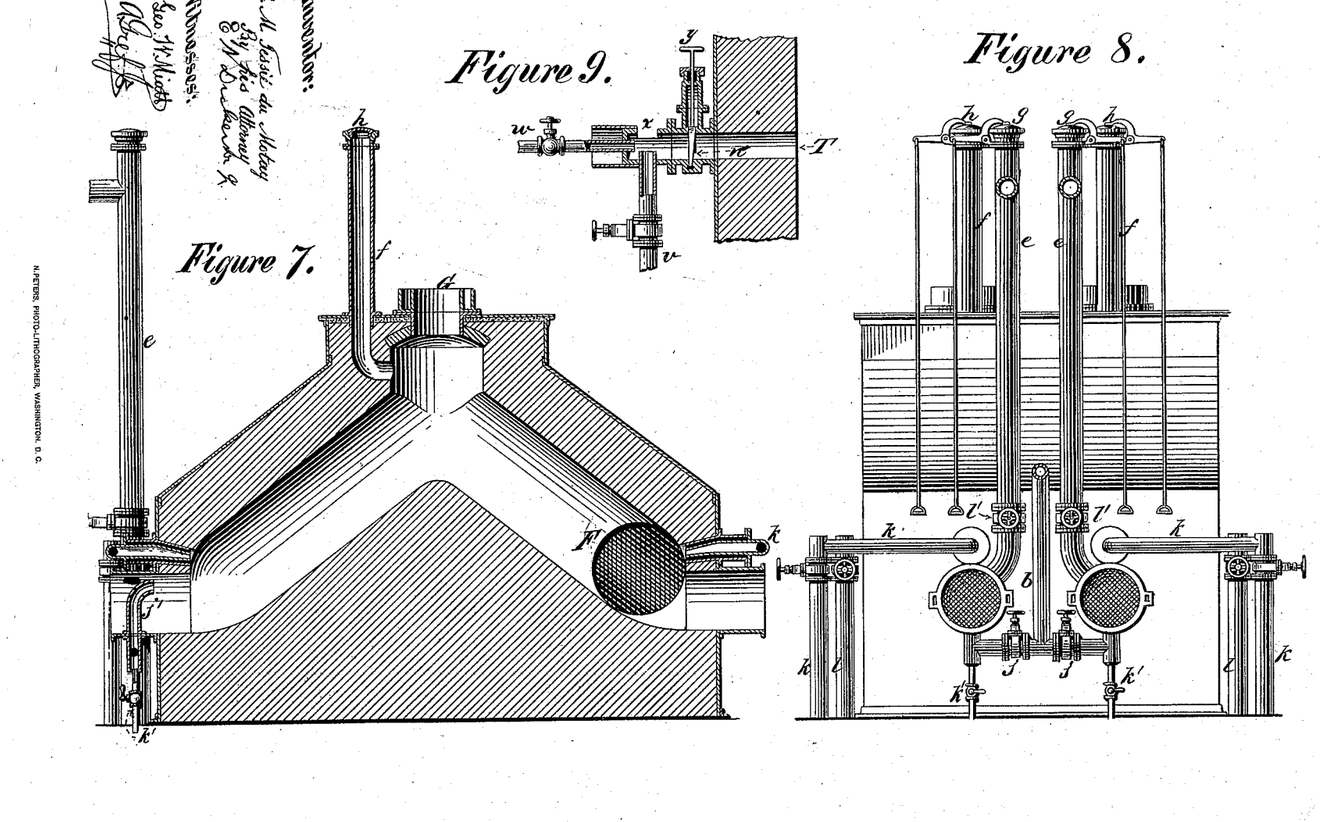
Fig. 7, a vertical section through one of said furnaces.
Fig. 8, a front elevation, showing some of the connections.
Fig. 9, a view, partly in section, showing a method of igniting the gas in the converting-furnaces.

The pipe $b$, previously described, communicates with a pair of converting-furnaces, E. These furnaces are fully shown in Figs. 1, 5, 6, 7, 8, and 9. Each furnace consists of a double chamber, as is clearly shown in Fig. 6. These chambers are each in the form of a bent or broken cylinder or inverted V, or of two inclined cylinders, as is shown in Fig. 7. Each of these chambers is arranged with a supply-tube, G, at the top, by means of which lime is fed to it. This lime, being fed from the central apex, supplies both ends of the chamber. Escape-pipes $f$ are also provided for use, to be described. They are arranged with valves $h$. The mixture of steam and naphtha coming from the superheaters by the pipe $b$ passes into either one of the chambers of either furnace by means a divided pipe, its course being determined by suitable valves. Its entrance into either one of the chambers of the converting-furnace is determined by valves $j$, Fig. 8. Both ends of these chambers are provided also with gas and air pipes, for the purpose of introducing into the same and burning a mixture of gas and air.

$l$ represents a pipe communicating at the front and back ends of each chamber by suitable tuyeres connected with a supply of combustible gas containing a certain amount of hydrogen, as described. The pipe $k$ supplies the air necessary for the combustion of the gas supplied by the pipe $l$. As shown, the gas and air are introduced by means of a double concentric tuyere; but any other suitable way may be used. Pipes $e$ are provided, which carry off the hydrogen gas to the holder, and they are also provided with purge-valves $g$, for the purpose of thoroughly purging the apparatus before the production of the hydrogen gas. These pipes are also provided with suitable valves $l'$, as shown, by means of which the hydrogen gas or the converted gas can be caused to flow in either direction.

The mixture of steam and naphtha vapor enters the ends of the chambers by means of pipes $j'$, Fig. 7, which pass somewhat above the bottom of the retort, as shown, so as to be above the lime, which would slide down the inclined plane. Cleansing-pipes $k'$ are used for the purpose of removing any sediment.

In the process to be described it becomes necessary to kindle at times in the converting-furnace the gas and air which are there admitted by the tuyeres described. This can be done in any well-known way; but I have devised a little apparatus (shown in Fig. 9) by which it is readily accomplished. This apparatus consists of a tube, T, which communicates with the converting-furnace at some point near the supply-point of gas and air, previously described. The pipe $v$ is provided, which is supplied with a continuous current of gas, which is kept continually alight, and burns upward through the opening $x$. The valve $n'$, controlled by rod $y$, shuts off this flame from the interior of the furnace. When it is desired to light the same the pipe $w$, connected with a supply of compressed air, is opened, when the flame, passing upward from the pipe $v$, is blown inward through the tube T, thereby lighting the gas previously supplied by the tuyere $k$.

Figure 1:
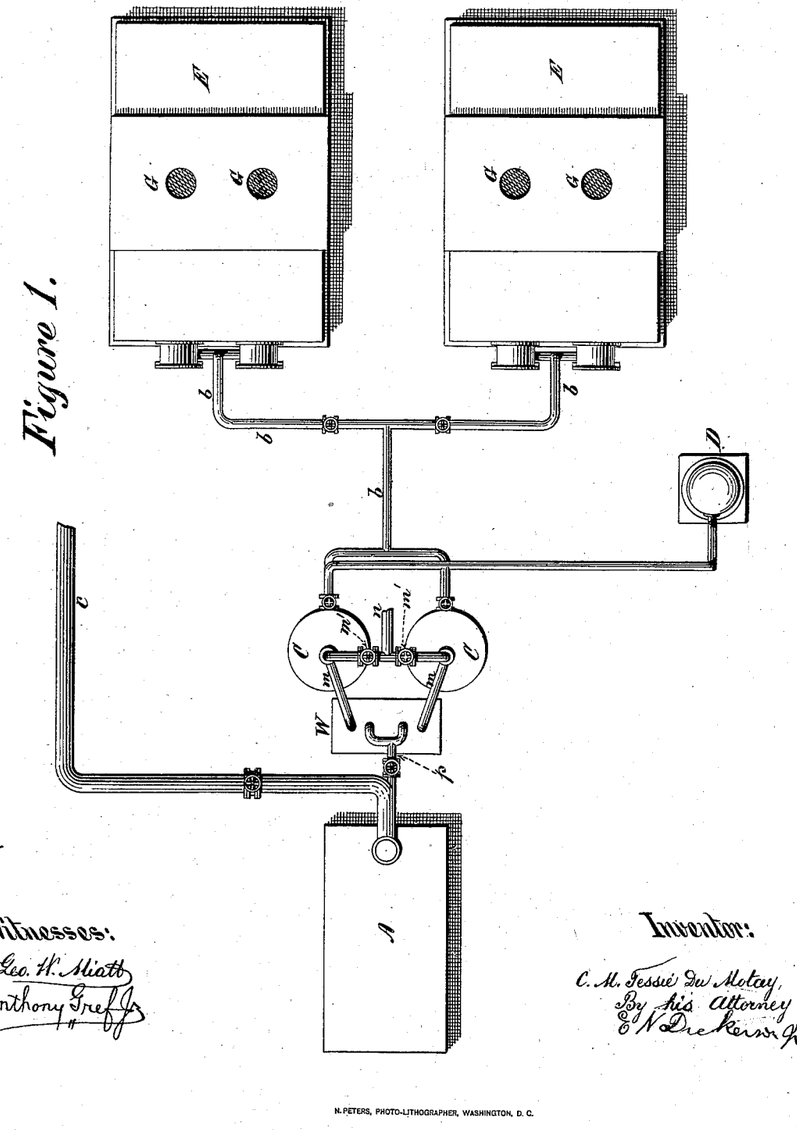
Figure 1 represents a plan view of the entire apparatus.
Figure 2:
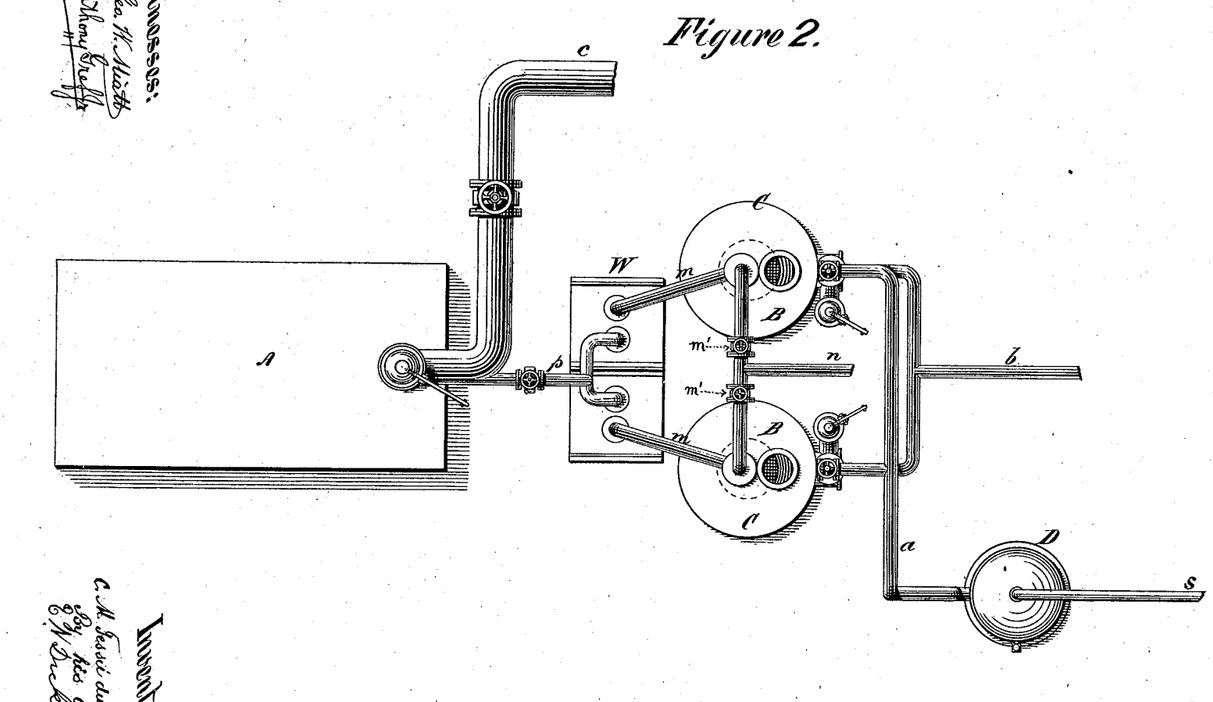
Fig. 2, a more detailed view of the gas-generator, superheaters, and naphtha-supply apparatus.
Figure 3:
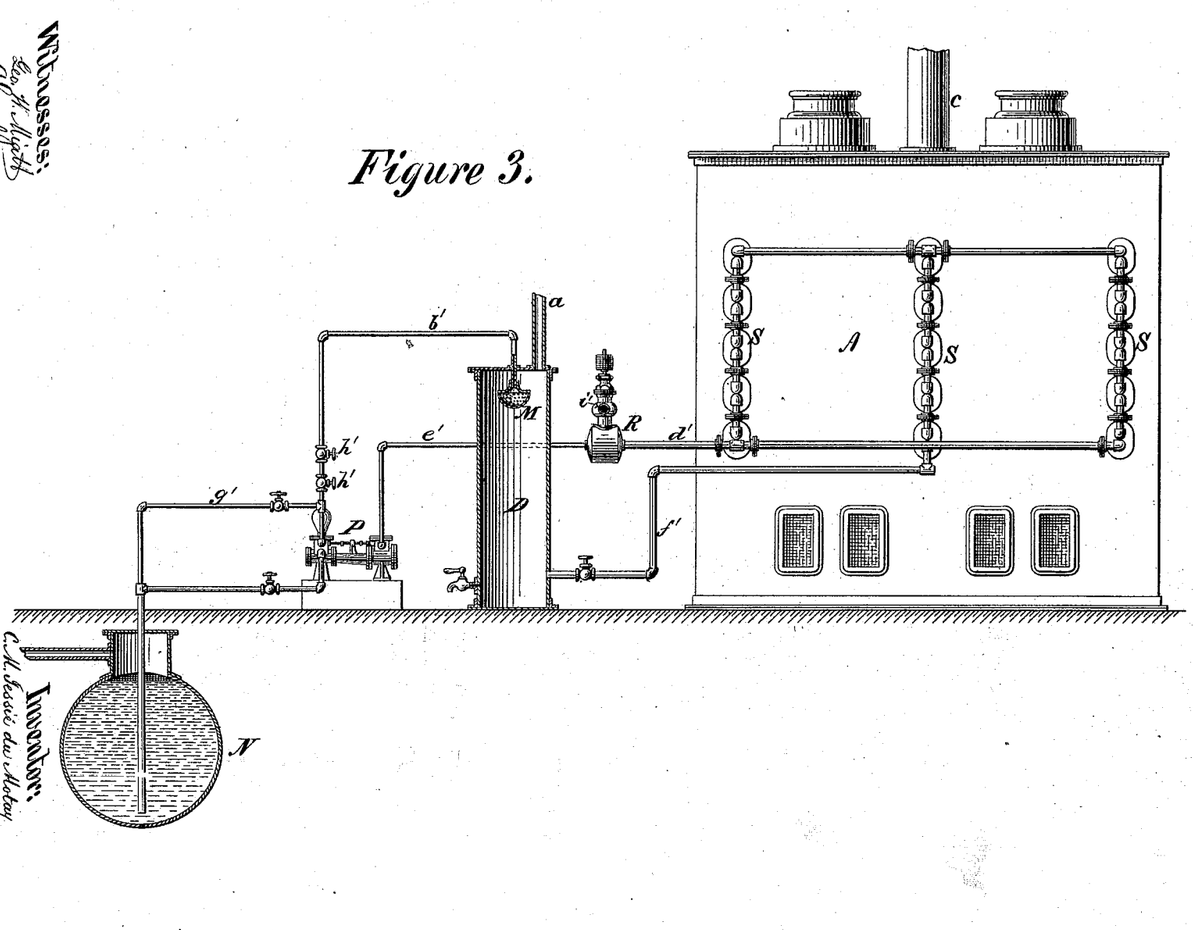
Fig. 3 represents a view, partially in section, of the naphtha-supply apparatus, the naphtha-tank, and the steam-superheating apparatus.

The operation of the apparatus can now be readily understood. It is first necessary to thoroughly heat one of the superheating-chambers C and one of the converting-furnaces E. These are made double, for the purposes already described. Gas produced in the generator A is introduced into the top of one of the superheaters by the pipe $m$, described. At the same time a sufficient supply of air is brought in contact with it by one of the branch pipes $n$, provided with suitable valves $m'$, one being open and the other closed. The purge-valve $t$ is simultaneously opened, allowing the escape of the products of this combustion. At the same time a sufficient supply of gas and air is admitted by the pipes $k$ and $e$ to one of the chambers of one of the two furnaces E; or, if necessary, a supply to both chambers, or a greater supply to one chamber than to the other, it being necessary that one of the chambers of the converting-furnace be hotter than the other. As soon as the superheater C has been sufficiently heated the supply of gas and air is shut off from it and allowed to enter the other superheater. At the same time superheated steam from the apparatus shown in Fig. 3 is caused to mingle with a sufficient amount of naphtha, and passed upward by pipe $a$ through the superheater, where it becomes thoroughly heated without being converted. The combined vapors of water and naphtha thus highly heated are fed into the hot side of the converting-furnace E. Passing through this, they become converted into hydrogen and carbonic acid, which carbonic acid is not taken up by the lime on account of its heat, but passing through the opening $F'$ into the other branch or side of the furnace E, it comes in contact with lime at a cooler temperature, and there the lime takes up the carbonic acid, forming carbonate of lime and leaving the hydrogen pure. Then the alternative action takes place. The naphtha and vapor are superheated in the other superheater, and are allowed to flow into the other converting-furnace. Meanwhile the mixture of gas and vapor described is burned with a sufficient supply of air in that one of the two chambers of the converting-furnace which had previously taken up the carbonic acid and contained carbonate of lime, whereby said carbonic acid is once more driven off, and the highly-heated lime remains ready to act upon the next supply of the vapors of steam and naphtha.

It may be necessary in heating the converting-furnace previous to the admission of the steam and naphtha to heat both chambers of the same, but to a different degree. This question of the relation of heats is a matter of experience, and can be easily determined by those acquainted with the business. It is very important, however, to have the two chambers heated to different temperatures, because the original decomposition has to take place in the presence of highly-heated lime; but the absorption of the carbonic acid takes place in the presence only of a cooler body of lime. It is plain, too, that these two masses of lime might be in separate chambers, if preferred.

What I claim as my invention, and desire to secure by Letters Patent, is—

1. In the manufacture of hydrogen, the process of producing hydrogen in a free—that is, uncombined—state, which consists in bringing naphtha vapor and steam into contact with a highly-heated body of lime, and thereby decomposing the hydrogen compounds contained in the naphtha vapor and steam, substantially as described.

2. In the manufacture of hydrogen, the process of facilitating the production of hydrogen in a free—that is, uncombined—state, which consists in highly heating vapor of naphtha and steam, then bringing them into contact with a highly-heated body of lime, and thereby decomposing the hydrogen compounds contained in the naphtha vapor and steam, substantially as described.

3. In the manufacture of hydrogen, the process of effecting the separation in a purified state of the hydrogen from its compounds, which consists in bringing naphtha vapor and steam into contact with a highly-heated body of lime, thereby decomposing the hydrogen compounds contained in the naphtha vapor and steam, and then passing the gaseous products through a cooler body of lime, whereby carbonic acid is absorbed, substantially as described.

4. In the manufacture of hydrogen, the process of producing hydrogen which consists in highly heating vapor of naphtha and steam, bringing the naphtha vapor and steam into contact with a highly-heated body of lime, thereby decomposing the hydrogen compounds contained in the naphtha vapor and steam, and passing the gaseous products through a cooler body of lime, whereby the carbonic acid is absorbed and separated from the hydrogen, substantially as described.

5. In the manufacture of hydrogen, the process of revivifying the lime used for separating carbonic acid from the hydrogen, which consists in burning in its presence a sufficient supply of gas containing hydrogen, substantially as described.

6. The process of manufacturing hydrogen by the repeated use of the same lime, whereby the operation can be made continuous, which consists of the following steps, viz: first, highly heating vapor of naphtha and steam; second, bringing the naphtha vapor and steam into contact with a highly-heated body of lime, thereby decomposing the hydrogen compounds contained in the naphtha vapor and steam, and producing hydrogen in a free—that is, uncombined—state; third, passing the gaseous products through a cooler body of lime, whereby carbonic acid is absorbed and separated from the hydrogen; fourth, revivifying the lime when charged with carbonic acid by burning in its presence a sufficient supply of gas containing hydrogen; and, fifth, continuing the operation with the revivified lime, substantially as described.

7. The combination, in an apparatus for producing hydrogen, of an apparatus for mingling steam and naphtha, an apparatus for heating their mingled vapors, and a converting lime-furnace for decomposing said vapors and converting them into hydrogen, as described.

8. In an apparatus for producing hydrogen pure, the combination of the gas-generator A, steam and naphtha supply apparatus D, the two superheaters C, and the two converting-furnaces, and the pipes and connections shown, whereby a continuous supply of hydrogen is produced, substantially as described.

9. The converting-furnace herein described, which consists of an inverted-V-shaped chamber having a supply-opening at the center and entrance and delivery-openings at either end, substantially as described.

10. The double converting lime-furnace herein described, which consists of two chambers disconnected at one end and connected at the other, containing lime at different temperatures, each chamber having an opening for introducing the lime, and inlet and outlet openings for the gaseous products being also provided, substantially as described.

11. The combination of two lime-chambers, and the pipes and connections shown for introducing a gas at either end of the same, substantially as described.

12. In an apparatus in which steam and naphtha are used together in the production of gas, the combination of a steam-pipe bringing the steam from the boiler, a steam-valve regulating its flow, and a branched pipe, one branch leading to a naphtha-supply pump and the other to the apparatus where the steam is to be used, whereby the supply of naphtha and the supply of steam used with it are simultaneously varied, substantially as described.

13. In an apparatus in which steam and naphtha are used together in the production of gas, the combination of a steam-pipe bringing the steam from the boiler, an automatic pressure-regulator and steam-valve regulating its flow, and a branched pipe, one branch leading to a naphtha-supply pump and the other to the apparatus where the steam is to be used, whereby the supply of naphtha and the supply of steam used with it are simultaneously varied, substantially as described.

C. M. TESSIÉ DU MOTAY.

Witnesses:
S. F. SULLIVAN,
GEO. H. EVANS.